United States Patent [19]

Maekawa

[11] Patent Number: 5,663,953

[45] Date of Patent: Sep. 2, 1997

[54] MULTIPOINT INTERCOMMUNICATION WITH PRE-QUERYING OF MEMBERS AS TO PARTICIPATION

[75] Inventor: Yoshito Maekawa, Yokohama, Japan

[73] Assignee: Canon Kabushiki Kaisha, Tokyo, Japan

[21] Appl. No.: 527,461

[22] Filed: Sep. 13, 1995

[30] Foreign Application Priority Data

Sep. 20, 1994 [JP] Japan ................................... 6-224798

[51] Int. Cl.$^6$ ................................................. H04M 3/56
[52] U.S. Cl. ............................ 370/261; 370/263; 379/204
[58] Field of Search ........................ 370/62, 94.3, 85.13, 370/94.2, 112, 110.1, 401, 402, 407, 433, 437, 498, 260, 261–262, 263, 264; 379/202, 203, 204, 205, 206, 67; 348/13, 14, 15; 364/514 C, 514 R, 514 A

[56] References Cited

U.S. PATENT DOCUMENTS

| | | | |
|---|---|---|---|
| 5,091,933 | 2/1992 | Katz | 379/205 |
| 5,309,434 | 5/1994 | Maekawa | 370/62 |
| 5,381,412 | 1/1995 | Otani | 370/112 |
| 5,392,284 | 2/1995 | Sugiyama | 370/112 |
| 5,402,418 | 3/1995 | Shibata et al. | 370/62 |
| 5,483,587 | 1/1996 | Hogan et al. | 379/67 |

FOREIGN PATENT DOCUMENTS

| | | |
|---|---|---|
| 4326239 | 11/1992 | Japan . |
| 5-22321 | 1/1993 | Japan . |
| 5022322 | 1/1993 | Japan . |

*Primary Examiner*—Douglas W. Olms
*Assistant Examiner*—Chau T. Nguyen
*Attorney, Agent, or Firm*—Fitzpatrick, Cella, Harper & Scinto

[57] ABSTRACT

There are proposed a communication station apparatus which can perform a multipoint intercommunication by connecting a plurality of points via a communication line, having an inquiry unit for sending, in advance, an inquiry as to participation in the multipoint intercommunication to the stations of members relating to the multipoint intercommunication, and a registration unit for receiving inquiry results sent from the members who received the inquiry from the inquiry unit, and registering a group of personal information of the members relating to the multipoint intercommunication in correspondence with the received results, and a communication station apparatus which can perform a multipoint intercommunication by connecting a plurality of points via a communication line, having an inquiry unit for sending, in advance, an inquiry as to participation in the multipoint intercommunication to stations of members relating to the multipoint intercommunication, and a communication path setting unit for receiving inquiry results sent from the members who received the inquiry from the inquiry unit, and setting a communication path for the multipoint intercommunication in correspondence with the received results.

20 Claims, 4 Drawing Sheets

MULTIPOINT INTERCOMMUNICATION WITH PRE-QUERYING OF MEMBERS AS TO PARTICIPATION

BACKGROUND OF THE INVENTION

1. Field of the Invention

The present invention relates to a communication station apparatus and its method of use in a multipoint intercommunication system for performing a multipoint intercommunication by connecting a plurality of points via communication lines.

2. Related Background Art

In recent years, AV (Audio Visual) services utilizing a digital network such as an ISDN (Integrated Services Digital Network) have received a lot of attention since communication services using the ISDN have been put into practical applications, and various kinds of multimedia communication apparatuses such as visual telephone apparatuses, video meeting systems, and the like are increasingly popular.

Normally by connecting a plurality of multimedia communication station apparatuses to a communication station apparatus called an MCU (Multipoint intercommunication Control Unit), multipoint multimedia communications can be realized. Recently, as disclosed in Japanese Laid-Open Patent Applications Nos. 04-326239, 05-22321, and 05-22322, a system for realizing a multipoint intercommunication without using an MCU by connecting a plurality of multimedia communication apparatuses in a chain or loop pattern has been proposed.

In the conventional multipoint intercommunication system, communication paths must be set for the respective multimedia communication apparatuses. As a method of setting communication paths for a multipoint intercommunication, for example, the names of members who plan to participate in a multipoint intercommunication, the telephone numbers of their multimedia communication apparatuses, and the like are registered in groups, and communication paths are set for the registered multimedia communication apparatuses.

However, since the above-mentioned conventional multipoint intercommunication system does not take account of whether or not these registered members actually plan to participate in the multipoint intercommunication, it is often inconvenient to confirm members who actually plan to participate in the multipoint intercommunication or to select members to serve as communication partners from among those who actually plan to participate in the communications.

Upon execution of the multipoint intercommunication, since a communication path is set even for the multimedia communication apparatus of a member who cannot participate in the multipoint intercommunication for some reason, if a public line is utilized for setting the communication path, extra line cost is incurred.

Furthermore, upon execution of the multipoint intercommunication, when available communication lines are divided by the number of points like in a system wherein images at the respective points are synthesized and displayed, the line rate assigned to a member who does not participate in the multipoint intercommunication is wasted, and communication lines cannot be effectively utilized.

SUMMARY OF THE INVENTION

The present invention has been made in consideration of the above situation and has as its object to provide a communication station apparatus and method, which can easily confirm whether or not a member actually plans to participate in a multipoint intercommunication, and can easily select members as communication partners form among those who actually plan to participate in the multipoint intercommunication.

In order to achieve the above object, according to one preferred aspect of the present invention, there is provided a communication station apparatus which can perform a multipoint intercommunication by connecting a plurality of points via a communication line, comprising: inquiry means for sending, in advance, an inquiry as to participation in the multipoint intercommunication to stations of members relating to the multipoint intercommunication; and registration means for receiving inquiry results sent from the members who received the inquiry from the inquiry means, and registering a group of personal information of the members relating to the multipoint intercommunication in correspondence with the received results.

It is another object of the present invention to provide a communication station apparatus and method which can reduce line cost even when a public line is utilized to set a communication path in a multipoint intercommunication, and can effectively utilize a communication line.

In order to achieve the above object, according to another preferred aspect of the present invention, there is provided a communication station apparatus which can perform a multipoint intercommunication by connecting a plurality of points via a communication line, comprising: inquiry means for sending, in advance, an inquiry as to participation in the multipoint intercommunication to stations of members relating to the multipoint intercommunication; and communication path setting means for receiving inquiry results sent from the members who received the inquiry from the inquiry means, and setting a communication path for the multipoint intercommunication in correspondence with the received results.

Other objects, features and advantages of the invention will become apparent from the following detailed description taken in conjunction with the accompanying drawings.

DETAILED DESCRIPTION OF THE PREFERRED EMBODIMENTS

An embodiment of a multipoint intercommunication system according to the present invention will be described below with reference to the accompanying drawings.

Figure 1:
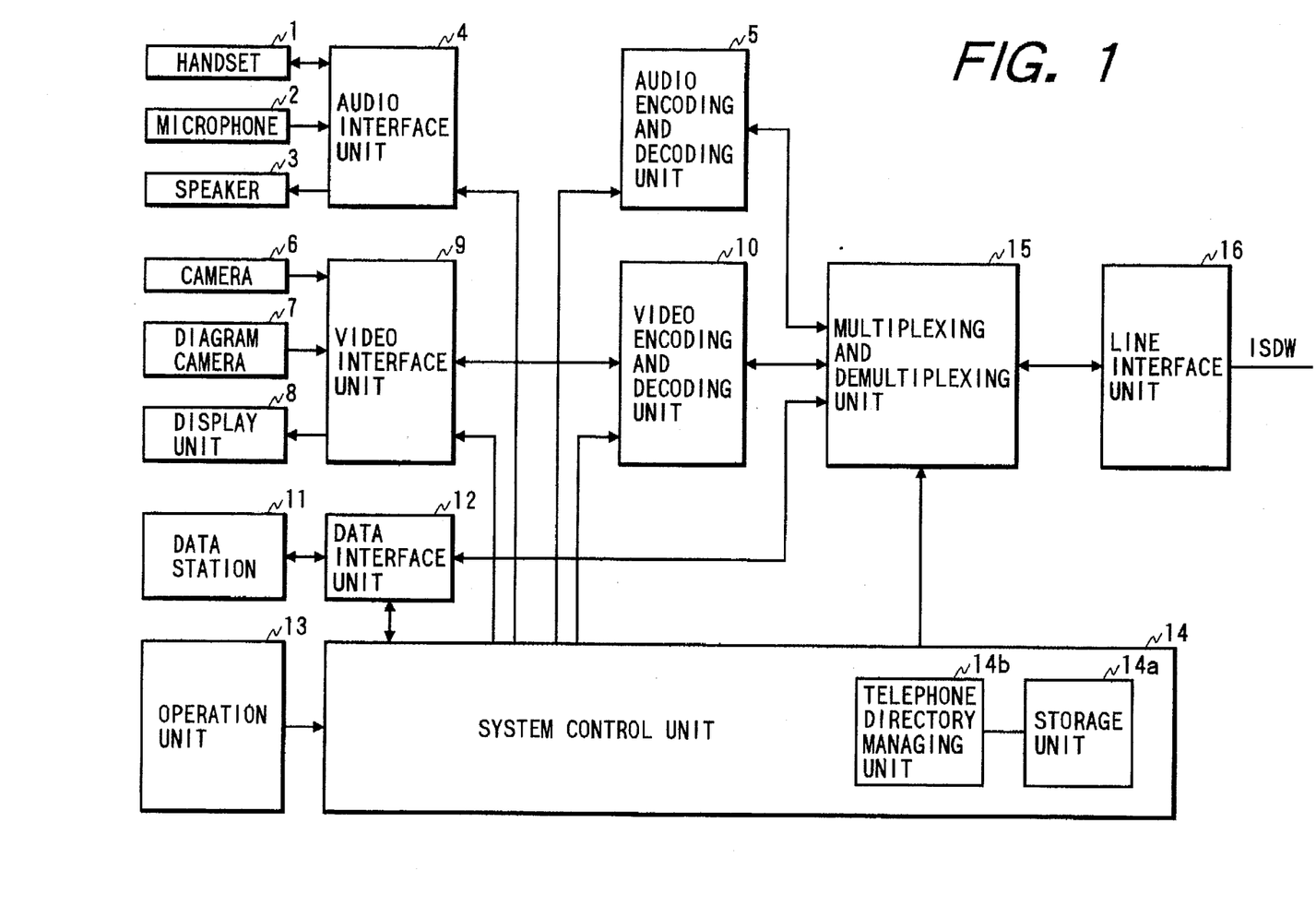
FIG. 1 is a block diagram showing the detailed arrangement of a multimedia communication station apparatus as a constituting element of a multipoint intercommunication system according to the present invention.

FIG. 1 is a block diagram showing the detailed arrangement of a multimedia communication station apparatus as a constituting element of the multipoint intercommunication system according to the present invention.

The apparatus shown in FIG. 1 includes a handset 1 as one example of audio input/output means, a microphone 2 as one example of audio input means, and a speaker 3 as one example of audio output means.

An audio interface unit 4 performs switching control of the handset 1, the microphone 2, and the speaker 3 to be used as audio input/output means in accordance with an instruction from a system control unit 14 (to be described later).

The audio interface unit 4 also performs on-/off-hook detection processing for detecting whether the handset 1 is set in an off- or on-hook state, echo cancel processing for canceling an echo when the microphone 2 and the speaker 3 as the audio input/output means are used, tone generation processing for generating a dial tone, audible ringing tone, busy tone, ringing, holding tone, and the like.

An audio encoding and decoding unit 5 encodes a transmission audio signal or decodes a received audio signal in accordance with audio signal encoding/decoding algorithms such as 64-kbps PCM A-law, 64-kbps PCM μ-law, 64-kbps/56-kbps/48-kbps SB-ADPCM (7-kHz audio), 32-kbps SB-ADPCM, 16-kbps (e.g., APC-AB), 8-kbps APC-AB, and the like in accordance with an instruction from the system control unit 14.

A camera 6 as one example of image input means is used for inputting, e.g., a portrait image. A diagram camera 7 as one example of image input means is used for inputting images such as a picture, figure, and the like. A display unit 8 displays an input image from the camera 6 or the diagram camera 7, an image received from another station, an operation screen, and the like.

A video interface unit 9 performs switching processing of the image input means, display switching processing among the input image, received image, and operation screen, image signal synthesis processing for divisionally displaying them on the display unit 8, and the like in accordance with an instruction from the system control unit 14.

A video encoding and decoding unit 10 performs encoding of a transmission image and decoding of a received image in accordance with the ITU-T recommendation H.261.

A data station 11 is used for performing a data communication. A data interface unit 12 supplies transmission data from the data station 11 and the system control unit 14 to a multiplexing and demultiplexing unit 15 (to be described later), and supplies received data to the data station 11 or the system control unit 14. An operation unit 13 comprises a keyboard, touch panel, and the like, which are used for inputting control information for controlling the entire multimedia communication apparatus of this embodiment.

The system control unit 14 comprises a CPU, ROM RAM, auxiliary storage device, and the like, and performs generation of an operation/display screen in correspondence with the control state of the entire apparatus, execution of an application program, and the like. The system control unit 14 also comprises a storage unit 14a for storing the personal information of members of a multipoint intercommunication, and a telephone directory managing unit 14b for managing a multipoint intercommunication telephone directory.

The multiplexing and demultiplexing unit 15 multiplexes, according to ITU-T recommendations H.221, an audio signal from the audio encoding and decoding unit 5, an image signal from the video encoding and decoding unit 10, data from the data interface unit 12, data from the system control unit 14, and control information such as a frame synchronization signal (FAS), a bit rate assignment signal (BAS) based on the ITU-T recommendations H.221 and H.242, and the like in units of transmission frames, and demultiplexes received frames in units of constituting media and supplies them to the respective units.

A line interface unit 16 controls a line in accordance with an ISDN user network interface.

Functions (1) in (7) provided to the system control unit 14 and associated with the present invention will be described in detail below.

(1) Inquiry Function: a function of inquiring, in advance, of members of a multipoint intercommunication to be performed by connecting a plurality of points via communication lines as to whether or not they plan actually to participate in the multipoint intercommunication;

(2) Response Function: a function of sending back a response indicating participation or absence in a multipoint intercommunication in response to an inquiry as to participation in the multipoint intercommunication performed by the inquiry function;

(3) Registration Function: a function of registering a plurality of groups of personal information of members in correspondence with the response results indicating participation or absence in a multipoint intercommunication by the response function;

(4) Display Function: a function of displaying the personal information of members registered by the registration function in units of groups;

(5) Communication path Setting Function: a function of setting a communication path for a multipoint intercommunication for the station of a member registered by the registration function;

(6) Selection Function: a function of selecting at least one of a plurality of groups divided by the registration function; and (7) Transfer Function: a function of transferring various data to the stations of members registered in the group selected by the selection function.

In the multipoint intercommunication system using the multimedia communication station apparatus with the above arrangement, processing upon registration of multipoint intercommunication members will be described below with reference to the flow chart in FIG. 2.

In step S1, a group of personal information of all members relating to a multipoint intercommunication is registered.

In this registration processing, in practice, as shown in the multipoint intercommunication telephone directory (registered) in Table 1 below, the names and telephone numbers of members relating to the multipoint intercommunication are sequentially registered using the operation unit 13, and the telephone directory managing unit 14b stores the input personal information in the storage unit 14a.

TABLE 1

Multipoint Intercommunication Telephone Directory (Registered)

| Name | Telephone Number |
| --- | --- |
| AAAA | 111-1111 |
| BBBB | 222-2222 |
| CCCC | 333-3333 |
| DDDD | 444-4444 |

In step S2, all the pieces of personal information of the members of the group registered by the telephone directory managing unit 14b are copied to a non-response group in the storage unit 14a. At this point, all the pieces of personal information of the four members shown in Table 1 above are registered in the non-response group.

In step S3, all the members registered in the non-response group are asked as to whether or not they actually want to participate in the multipoint intercommunication. This processing is attained by the inquiry function. The telephone numbers of the respective members are read out by the telephone directory managing unit 14b, and data for inquiring participation in the multipoint intercommunication is sent to the respective members via the line interface unit 16.

Figure 3:
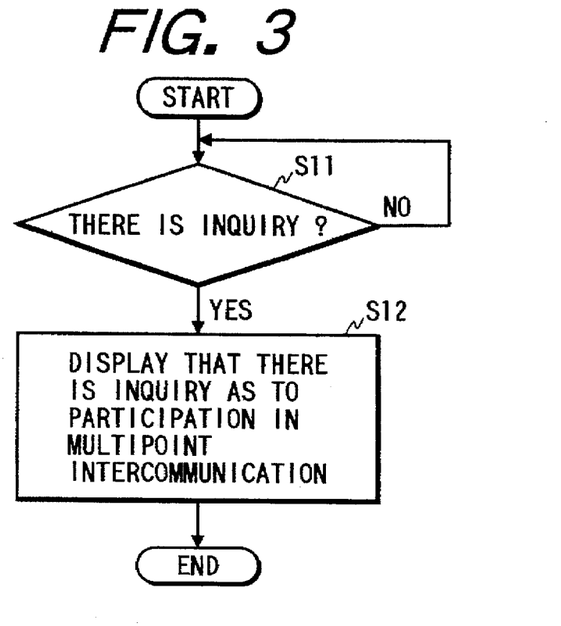
FIG. 3 is a flow chart for explaining the processing sequence executed when there is an inquiry from another station as to participation in a multipoint intercommunication in the embodiment shown in FIG. 1.

Each multimedia communication station apparatus which responds to the inquiry as to participation in the multipoint intercommunication performs the processing shown in the flow chart in FIG. 3.

More specifically, in step S11 in FIG. 3, it is monitored as to whether there is an inquiry as to participation in the multipoint intercommunication. When data for inquiring participation in the multipoint intercommunication is received via the line interface unit 16, the flow advances to step S12, and reception of the inquiry is displayed on the display unit 8.

Figure 4:
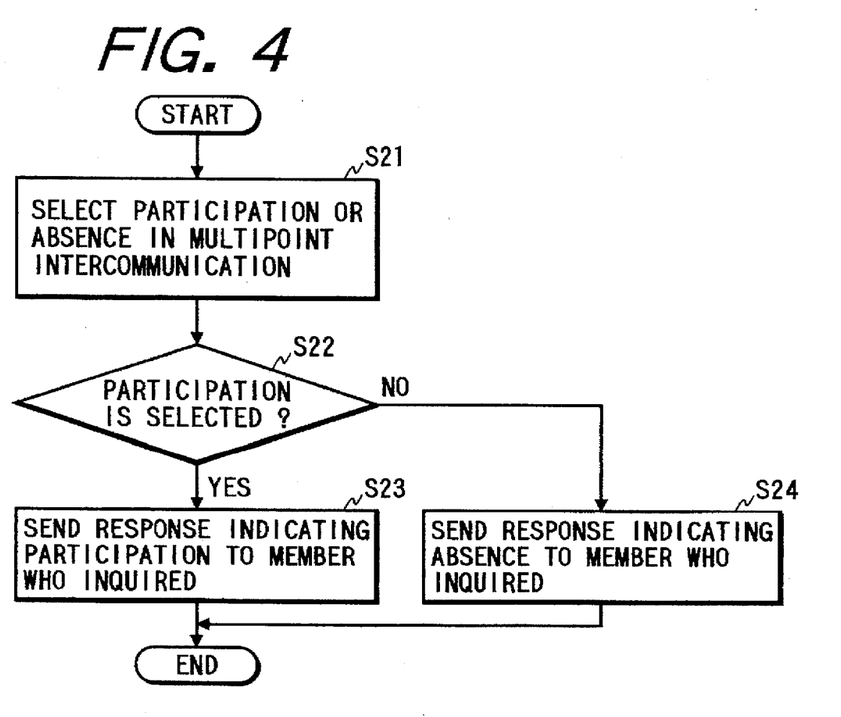
FIG. 4 is a flow chart for explaining the response processing sequence to the inquiry as to participation in a multipoint intercommunication from the other station in the embodiment shown in FIG. 1.

Processing for sending back a response to the inquiry as to participation in the multipoint intercommunication will be described below with reference to the flow chart in FIG. 4.

In step S21, a member selects participation in or absence from the multipoint intercommunication. It is checked in step S22 if participation is selected. If it is determined based on an input from the operation unit 13 that participation is selected, the flow advances to step S23, and a response indicating participation in the multipoint intercommunication is sent to a member who inquired. This response is attained by the response function. In practice, data indicating participation in the multipoint intercommunication is sent to a member who inquired, via the line interface unit 16.

On the other hand, if it is determined based on an input from the operation unit 13 in step S22 that absence is selected, the flow advances to step S24, and a response indicating absence in the multipoint intercommunication is sent to a member who inquired. This response is attained by the response function. In practice, data indicating absence in the multipoint intercommunication is sent to a member who inquired, via the line interface unit 16.

In the multimedia communication station apparatus which inquired participation in the multipoint intercommunication, the processing shown in the flow chart in FIG. 2 is performed again.

Figure 2:
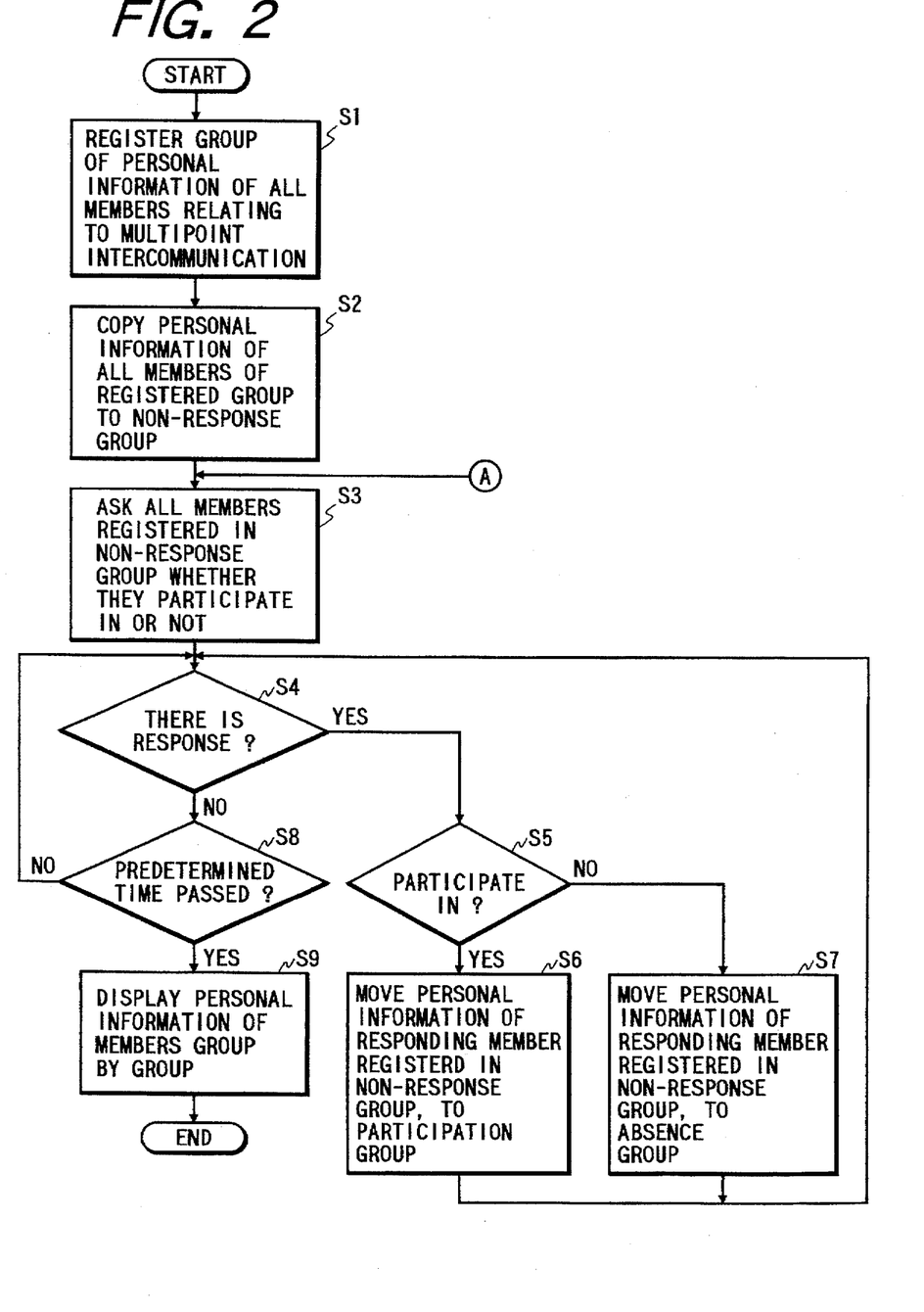
FIG. 2 is a flow chart for explaining the processing sequence executed when members of a multipoint intercommunication are to be registered in the embodiment shown in FIG. 1.

More specifically, in step S4 in FIG. 2, it is monitored if there is a response to the inquiry as to participation in the multipoint intercommunication.

If data indicating the participation or absence in the multipoint intercommunication is received via the line interface unit 16, the flow advances to step S5 to check the contents of the data indicating the participation or absence in the multipoint intercommunication, so as to determine if a corresponding member wants to participate in the intercommunication.

If it is determined in step S5 that the data indicates participation, the flow advances to step S6, and the telephone directory managing unit 14b moves the personal information of the responding member registered in the non-response group in the storage unit 14a to a participation group in the storage unit 14a.

On the other hand, if it is determined in step S5 that the data indicates absence, the flow advances to step S7, and the telephone directory managing unit 14b moves the personal information of the responding member registered in the non-response group in the storage unit 14a to a disparticipation group in the storage unit 14a.

On the other hand, if it is determined in step S4 that there is no response, the flow advances to step S8 to monitor a response as to participation in the multipoint intercommunication. This monitoring step is repetitively executed until it is determined in step S8 that a predetermined time has passed.

If it is determined in step S8 that the predetermined time has passed, the flow advances to step S9, and all the pieces of personal information of members relating to the multipoint intercommunication are grouped, as shown in a multipoint intercommunication telephone directory (inquiry result) shown in Table 2 below. More specifically, in step S9, all the pieces of personal information of members relating to the multipoint intercommunication are displayed in units of groups on the display unit 8, as shown in Table 2.

TABLE 2

Multipoint Intercommunication Telephone Directory (Inquiry Result)

| Result | Name | Telephone Number |
| --- | --- | --- |
| Participation | AAAA | 111-1111 |
|  | BBBB | 222-2222 |
| Absence | CCCC | 333-3333 |
| No Response | DDDD | 444-4444 |

Note that the flow chart shown in FIG. 2 is programmed to repetitively ask a member who does not send back a response to an inquiry as to participation in the multipoint intercommunication, by repetitively executing the flow from a portion A in FIG. 2. In the case of the multipoint intercommunication telephone directory (inquiry result) shown in Table 2 above, an inquiry can be repetitively executed for the member DDDD.

Figure 5:
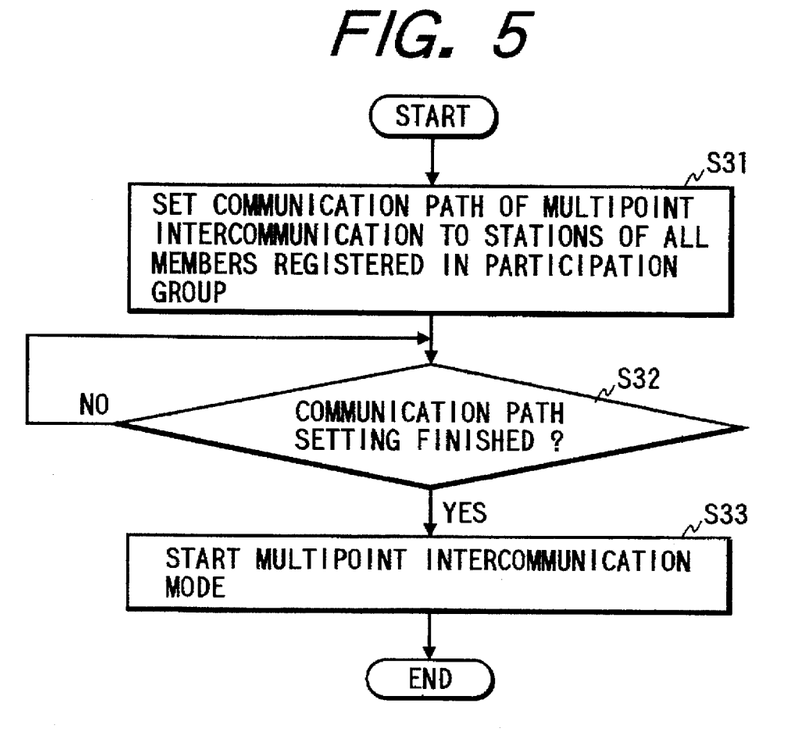
FIG. 5 is a flow chart for explaining the processing sequence executed when a communication path for a multipoint intercommunication is set in the embodiment shown in FIG. 1.

When a communication path for the multipoint intercommunication is to be set, the processing shown in the flow chart in FIG. 5 is applied. In step S31, communication paths for the multipoint intercommunication are set for the stations of all the members registered in the participation group.

The communication paths are set by the communication path setting function. In the case of the multipoint intercommunication telephone directory (inquiry result) shown in Table 2 above, the telephone directory managing unit 14b reads out the telephone numbers of members AAAA and BBBB stored in the participation group in the storage unit 14a, and communication paths for the multipoint intercommunication are set with the stations of these members via the line interface unit 16.

In step S32, it is monitored if the setting operation of the communication paths is finished. If it is determined in step S32 that the setting operation of the communication paths is finished, the flow advances to step S33, and the multipoint intercommunication mode is started. Thereafter, the multipoint intercommunication can be performed.

Figure 6:
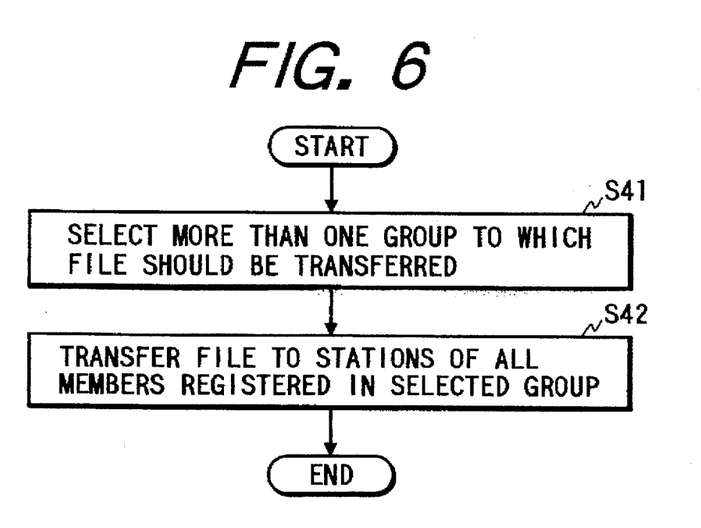
FIG. 6 is a flow chart for explaining the processing sequence upon file transfer in the embodiment shown in FIG. 1.

When various files such as references for meeting, minutes, and the like are to be transferred, the processing shown in the flow chart in FIG. 6 is performed by the transfer function.

In this case, in step S41, at least one group to which a file is to be transferred is selected. In this case, various selections may be made in correspondence with files to be selected. For example, only the participation group may be selected when a reference for meeting is to be transferred, and all the groups may be selected when minutes are to be transferred.

The flow advances to step S42 and a file is transferred to the stations of all the members registered in the group selected in step S41. For example, when only the participation group in the multipoint intercommunication telephone directory (inquiry result) in Table 2 is selected by the selection function, the telephone directory managing unit 14b reads out the telephone numbers of members AAAA and BBBB stored in the participation group in the storage unit 14a, and a file is transferred to the stations of these members via the line interface unit 16.

Various changes and modifications may be made without departing from the spirit and scope of the invention.

For example, a network to which the multimedia communication station apparatus constituting the multipoint intercommunication system of this embodiment is not limited to the ISDN. However, the present invention may be applied to various other networks such as a PSTN (analog telephone network), a CSPD (line exchange network), a LAN, and the like.

In the above embodiment, all the pieces of personal information of members are copied to the non-response group upon completion of the group registration for the first time. Alternatively, members who have not responded after the lapse of a predetermined time may be searched for, and may be simultaneously registered in the non-response group.

In the above embodiment, all the pieces of personal information of members are displayed in units of groups after the lapse of a predetermined time. However, such a display may be made each time a response is received.

The contents and the number of a plurality of groups are not limited to three groups including the participation group, absence group, and non-response group, unlike in the above embodiment.

An inquiry as to participation in a multipoint intercommunication may be performed simultaneously with sending of an invitation message of the multipoint intercommunication. In this case, document data of the invitation message of the multipoint intercommunication is sent together with data for inquiring participation in the multipoint intercommunication. When a response time limit is determined for the inquiry as to participation in a multipoint intercommunication, whether or not a predetermined time has passed may be monitored until the response time limit expires.

In order to specify the destination of a response to the inquiry as to participation in a multipoint intercommunication, it is preferable to send the personal information of a member who inquired, together with the inquiry data.

Also, in order to specify the source of a response to the inquiry as to participation in a multipoint intercommunication, it is preferable to send the personal information of the responding member together with the response data.

In the above embodiment, the functions (1) to (7) for realizing the multipoint intercommunication system are provided to one multimedia communication station apparatus. However, the multimedia communication station apparatus may be divided into a transmitter and a receiver, and the functions (1) to (7) may be distributed to the transmitter and the receiver.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A communication station apparatus which can perform a multipoint intercommunication by connecting a plurality of points via a communication line, comprising:
    a) inquiry means for sending, in advance, an inquiry as to participation in the multipoint intercommunication to stations of members relating to the multipoint intercommunication; and
    b) registration means for receiving inquiry results sent from the members who received the inquiry from said inquiry means, and registering a group of personal information of the members relating to the multipoint intercommunication in correspondence with the received results.

2. An apparatus according to claim 1, wherein said registration means registers a group of personal information of members who have not sent back the inquiry results before a predetermined time passes.

3. An apparatus according to claim 1, wherein said registration means registers a group of personal information of members who send back the inquiry results indicating participation in the multipoint intercommunication.

4. An apparatus according to claim 1, wherein said registration means registers a group of personal information of members who send back the inquiry results indicating disparticipation in the multipoint intercommunication.

5. An apparatus according to claim 1, wherein said inquiry means repetitively sends the inquiry as to participation in the multipoint intercommunication to the members who do not send back the inquiry results.

6. An apparatus according to claim 1, further comprising:
    communication path setting means for setting a communication path for the multipoint intercommunication in correspondence with the inquiry results.

7. An apparatus according to claim 1, further comprising:
    transfer means for transferring various data to the stations of members of groups registered by said registration means in units of groups.

8. An apparatus according to claim 1, further comprising:
    display means for displaying personal information of the members registered by said registration means in units of groups.

9. An apparatus according to claim 1, further comprising:
    response means for sending back a response to the inquiry sent from the inquiry means of at least one of the stations of said members relating to the multipoint intercommunication.

10. A communication station apparatus which can perform a multipoint intercommunication by connecting a plurality of points via a communication line, comprising:
    a) inquiry means for sending, in advance, an inquiry as to participation in the multipoint intercommunication to stations of members relating to the multipoint intercommunication;

b) communication path setting means for receiving inquiry results sent from the members who received the inquiry form said inquiry means, and setting a communication path for the multipoint intercommunication in correspondence with the received results; and c) response means for sending back a response to the inquiry sent from the inquiry means of at least one of the stations of said members relating to the multipoint intercommunication.

11. A communication station method which can perform a multipoint intercommunication by connecting a plurality of points via a communication line, comprising the steps of:

a) sending, in advance, an inquiry as to participation in the multipoint intercommunication to stations of members relating to the multipoint intercommunication; and b) receiving inquiry results sent from the members who received the inquiry, and registering a group of personal information of the members relating to the multipoint intercommunication in correspondence with the received results.

12. A method according to claim 11, wherein said registering step includes registering a group of personal information of members who have not sent back the inquiry results before a predetermined time passes.

13. A method according to claim 11, wherein said registering step includes registering a group of personal information of members who send back the inquiry results indicating participation in the multipoint intercommunication.

14. A method according to claim 11, wherein said registering step includes registering a group of personal information of members who send back the inquiry results indicating disparticipation in the multipoint intercommunication.

15. A method according to claim 11, wherein said sending step includes repetitively sending the inquiry as to participation in the multipoint intercommunication to the members who do not send back inquiry results.

16. A method according to claim 11, further comprising the step of setting a communication path for the multipoint intercommunication in correspondence with the inquiry results.

17. A method according to claim 11, further comprising the step of transferring various data to the stations of members of groups registered in said registering step, in units of groups.

18. A method according to claim 11, further comprising the step of displaying personal information of the members registered in said registering step, in units of groups.

19. A method according to claim 11, further comprising the step of sending back a response to the inquiry sent from at least one of the stations of the members, relating to the multipoint intercommunication.

20. A communication station method which can perform a multipoint intercommunication by connecting a plurality of points via a communication line, comprising the steps of:

a) sending, in advance, an inquiry as to participation in the multipoint intercommunication to stations of members relating to the multipoint intercommunication;

b) receiving inquiry sent from the members who received the inquiry, and setting a communication path for the multipoint intercommunication in correspondence with the received results; and c) sending back a response to the inquiry sent from at least one of the stations of said members relating to the multipoint intercommunication.

* * * * *

UNITED STATES PATENT AND TRADEMARK OFFICE
CERTIFICATE OF CORRECTION

PATENT NO. : 5,663,953

DATED       : September 2, 1997

INVENTOR(S): YOSHITO MAEKAWA

It is certified that error appears in the above-identified patent and that said Letters Patent is hereby corrected as shown below:

COLUMN 2

Line 4, "form" should read --from--.

COLUMN 8
Line 9, "not" should read --is not--.

COLUMN 9

Line 5, "form" should read --from--.

Signed and Sealed this

Twelfth Day of May, 1998

Attest:

BRUCE LEHMAN

Attesting Officer        Commissioner of Patents and Trademarks